(12) United States Patent
Jones et al.

(10) Patent No.: US 8,671,008 B2
(45) Date of Patent: Mar. 11, 2014

(54) METHOD FOR NOTIFYING TASK PROVIDERS TO BECOME ACTIVE USING INSTANT MESSAGING

(75) Inventors: Scott A. Jones, Carmel, IN (US);
Thomas E. Cooper, Carmel, IN (US);
Brad Bostic, Carmel, IN (US)

(73) Assignee: ChaCha Search, Inc, Carmel, IN (US)

( * ) Notice: Subject to any disclaimer, the term of this patent is extended or adjusted under 35 U.S.C. 154(b) by 1588 days.

(21) Appl. No.: 11/647,309

(22) Filed: Dec. 29, 2006

(65) Prior Publication Data
US 2008/0051064 A1 Feb. 28, 2008

Related U.S. Application Data

(60) Provisional application No. 60/807,423, filed on Jul. 14, 2006.

(51) Int. Cl.
*G06Q 10/00* (2012.01)

(52) U.S. Cl.
USPC .......................................................... 705/7.13

(58) Field of Classification Search
USPC ................................ 705/7.12, 7.13
See application file for complete search history.

(56) References Cited

U.S. PATENT DOCUMENTS

| | | | | |
|---|---|---|---|---|
| 5,615,121 A * | 3/1997 | Babayev et al. | .................. | 705/9 |
| 5,862,223 A | 1/1999 | Walker et al. | | |
| 5,909,679 A * | 6/1999 | Hall | ................................ | 1/1 |
| 5,913,201 A * | 6/1999 | Kocur | ............................... | 705/9 |
| 5,920,846 A * | 7/1999 | Storch et al. | ...................... | 705/7 |
| 5,963,911 A * | 10/1999 | Walker et al. | ..................... | 705/7 |
| 6,026,148 A * | 2/2000 | Dworkin et al. | ........... | 379/88.18 |
| 6,163,607 A * | 12/2000 | Bogart et al. | ............. | 379/266.01 |
| 6,223,165 B1 * | 4/2001 | Lauffer | ............................... | 705/8 |
| 6,272,467 B1 * | 8/2001 | Durand et al. | ..................... | 705/5 |
| 6,381,640 B1 | 4/2002 | Beck et al. | | |
| 6,430,602 B1 | 8/2002 | Kay et al. | | |
| 6,470,338 B1 * | 10/2002 | Rizzo et al. | ............................ | 1/1 |
| 6,480,881 B1 * | 11/2002 | Kubota et al. | ................. | 709/202 |
| 6,505,166 B1 * | 1/2003 | Stephanou | ........................ | 705/8 |
| 6,507,821 B1 * | 1/2003 | Stephanou | ........................ | 705/8 |
| 6,510,431 B1 * | 1/2003 | Eichstaedt et al. | .................... | 1/1 |

(Continued)

FOREIGN PATENT DOCUMENTS

| | | |
|---|---|---|
| EP | 1 193 625 | 4/2002 |
| IN | WO2007052285 A2 | 5/2007 |
| KP | 010016151 A * | 5/2001 |

OTHER PUBLICATIONS

Looksamrt Announced Looksmart Live!—online Search Help from Real Editors Business Wire, Jun. 23, 1999.*

(Continued)

*Primary Examiner* — Scott L Jarrett
(74) *Attorney, Agent, or Firm* — Staas & Halsey

(57) ABSTRACT

A method and system for correlating a work request to a provider based on content of the work request and delegating the work request to the provider using an instant message (IM) service. An instant message service including those offered by existing IM service providers is used to notify a provider that a request has been received requesting work to be performed. The instant message may include a link to details of the work being requested, establish an electronic mail communication, point to a web site or initiate an application that communicates with web-enabled services on a server connected to the Internet.

12 Claims, 13 Drawing Sheets

(56) References Cited

U.S. PATENT DOCUMENTS

| | | | |
|---|---|---|---|
| 6,513,013 B1 | 1/2003 | Stephanou | |
| 6,523,010 B2 | 2/2003 | Lauffer | |
| 6,556,671 B1* | 4/2003 | Beauvois | 379/265.02 |
| 6,564,244 B1* | 5/2003 | Ito et al. | 709/204 |
| 6,567,784 B2* | 5/2003 | Bukow | 705/9 |
| 6,578,005 B1* | 6/2003 | Lesaint et al. | 705/8 |
| 6,769,013 B2* | 7/2004 | Frees et al. | 709/205 |
| 6,829,585 B1* | 12/2004 | Grewal et al. | 705/8 |
| 6,832,203 B1* | 12/2004 | Villena et al. | 705/8 |
| 6,850,895 B2* | 2/2005 | Brodersen et al. | 705/9 |
| 6,865,599 B2 | 3/2005 | Zhang | |
| 6,985,943 B2 | 1/2006 | Deryugin et al. | |
| 6,990,189 B2 | 1/2006 | Ljubicich | |
| 6,993,555 B2 | 1/2006 | Kay et al. | |
| 7,000,019 B2 | 2/2006 | Low et al. | |
| 7,043,521 B2* | 5/2006 | Eitel | 709/202 |
| 7,051,036 B2* | 5/2006 | Rosnow et al. | 707/723 |
| 7,197,459 B1* | 3/2007 | Harinarayan et al. | 704/270.1 |
| 7,287,021 B2* | 10/2007 | De Smet | 707/600 |
| 7,340,037 B1* | 3/2008 | Jean et al. | 379/9.02 |
| 7,617,248 B2* | 11/2009 | Ditcharo et al. | 1/1 |
| 7,660,848 B2* | 2/2010 | Torii | 709/203 |
| 7,769,617 B2* | 8/2010 | Iwasaki et al. | 705/8 |
| 7,783,513 B2* | 8/2010 | Lee | 705/7.42 |
| 2002/0010616 A1* | 1/2002 | Itzhaki | 705/9 |
| 2002/0029272 A1* | 3/2002 | Weller | 709/226 |
| 2002/0128891 A1* | 9/2002 | McSherry | 705/8 |
| 2002/0140715 A1* | 10/2002 | Smet | 345/700 |
| 2003/0037110 A1* | 2/2003 | Yamamoto | 709/204 |
| 2003/0037113 A1 | 2/2003 | Petrovykh | |
| 2003/0144895 A1* | 7/2003 | Aksu et al. | 705/9 |
| 2003/0154112 A1* | 8/2003 | Neiman et al. | 705/5 |
| 2003/0217097 A1* | 11/2003 | Eitel | 709/202 |
| 2004/0054802 A1 | 3/2004 | Beauchamp et al. | |
| 2004/0111313 A1* | 6/2004 | Ingman et al. | 705/9 |
| 2004/0133469 A1 | 7/2004 | Chang | |
| 2005/0060217 A1* | 3/2005 | Douglas et al. | 705/9 |
| 2005/0086211 A1 | 4/2005 | Mayer | |
| 2005/0125541 A1 | 6/2005 | Frank et al. | |
| 2005/0165881 A1* | 7/2005 | Brooks et al. | 709/200 |
| 2005/0273499 A1 | 12/2005 | Goodman et al. | |
| 2006/0004623 A1 | 1/2006 | Jasti | |
| 2006/0026147 A1 | 2/2006 | Cone et al. | |
| 2006/0031533 A1 | 2/2006 | Goodman et al. | |
| 2006/0064411 A1 | 3/2006 | Gross et al. | |
| 2006/0069730 A1 | 3/2006 | Azuma | |
| 2006/0184378 A1* | 8/2006 | Agarwal et al. | 705/1 |
| 2006/0241996 A1* | 10/2006 | Burger et al. | 705/9 |
| 2006/0259472 A1* | 11/2006 | MacClellan | 707/3 |
| 2006/0294083 A1* | 12/2006 | Benton et al. | 707/3 |
| 2007/0005698 A1 | 1/2007 | Kumar et al. | |
| 2007/0130126 A1* | 6/2007 | Lucovsky et al. | 707/3 |
| 2007/0174273 A1* | 7/2007 | Jones et al. | 707/5 |
| 2007/0185841 A1* | 8/2007 | Jones et al. | 707/3 |
| 2007/0282660 A1* | 12/2007 | Forth | 705/9 |
| 2008/0021755 A1* | 1/2008 | Jones et al. | 705/8 |
| 2010/0114684 A1* | 5/2010 | Neged | 705/14.14 |

OTHER PUBLICATIONS

Bicknell, Craig, Still Search? Ask a Human Wired, Jun. 13, 2000.*

Looksmarrt Live Web Pages Looksmarket, Live.LookSmart.com, Aug. 2000, Retrieved from Archive.org Jul. 20, 2010.*

Kahen, Leander, That's Mr. Search engine to You Wired, Mar. 10, 2000.*

Webhelp.com launches human-assisted search engine Information Today, vol. 17, No. 1, Jan. 2000.*

WebSearchExperts.com to be the First to Dominate the New Internet Search Engine Paradigm Business Wire, Oct. 21, 1999.*

Koffey, Nicole, Webhelp.com answers questions with a personal touch Forbes.com, Nov. 30, 1999.*

Human Search Engines the next killer app? HighBeam Research, 2000.* iNetNow Announces the First Human Powered Internet Search Engine Business Wire, Mar. 6, 2000.*

CHI, a Collaborative Human Interpreter Google Blogscoped, Mar. 25, 2005.* ingenio.com web pages Jun. 8, 2005.*

Keen.com web pages Jun. 8, 2005.*

Amazon's Mechanical Turk Google Blogscoped, Nov. 4, 2005.*

Iskold, Alex, ChaCha: A Human Powered Search Engine Dec. 14, 2006.*

Deng, Qijun et al., ADRE: A Novel Framework to Define Workflow Participants IEEE, Proceedings of the 2005 International Conference on e-Business Engineering, 2005.*

CentreVu Advocate—Release 9—User Guide Avaya Communications, Dec. 2000.*

ChaCha Releases Beta Version of the World's Largest Live Search Engine Business Wire, Nov. 6, 2006.*

Mahomen, Julie, Indiana U: Indiana U. alumnus creates new search engine has a 'human touch' University Wire, Oct. 3, 2006.*

Rupley, Sebastian, Search with a partner: ChaCha uses the "two heads are better than one" approach to searching PC Magazine, vol. 25, No. 18, Oct. 17, 2006.*

Macdonald, Nancy, Searching for help Maclean's, vol. 119, No. 40, Oct. 9, 2006.*

Start-ups rethink Internet search AFX International Focus, Dec. 6, 2006.*

U.S. Appl. No. 11/336,928, filed Jan. 23, 2006, Scott A. Jones, ChaCha Search, Inc.

U.S. Appl. No. 11,469,732, filed Jul. 10, 2006, Scott A. Jones et al., ChaCha Search, Inc.

U.S. Appl. No. 11/774,852, filed Jul. 9, 2007, Scott A. Jones et al., ChaCha Search, Inc.

U.S. Appl. No. 11/780,241, filed Jul. 18, 2007, Scott A. Jones et al., ChaCha Search, Inc.

U.S. Appl. No. 11/819,719, filed Jun. 28, 2007, Scott A. Jones et al., ChaCha Search, Inc.

U.S. Appl. No. 11/835,080, filed Aug. 7, 2007, Scott A. Jones, ChaCha Search, Inc.

U.S. Appl. No. 11/834,911, filed Aug. 7, 2007, Scott A. Jones, ChaCha Search, Inc.

U.S. Appl. No. 11/469,732, filed Sep. 1, 2006, Scott A. Jones et al., ChaCha Search, Inc.

U.S. Appl. No. 11/780,241, filed Jul. 19, 2007, Scott A. Jones et al., ChaCha Search, Inc.

International Search Report issued on Aug. 22, 2008 in corresponding PCT Application No. PCT/US07/73192.

* cited by examiner

| Providers | Category Word | IM Credentials | Provider Status | IM (online) Status | ... |
|---|---|---|---|---|---|
| Scott Jones | basketball, computers, literature, food and drink, arts | MSN® user name, ID | active | available | ... |
| Tom Cooper | health, arts, american authors, search engines | YAHOO® user name, ID | inactive | available | ... |
| Brad Bostic | literature, basketball, restaurants in Indiana | | active | available | ... |
| ... | | | | | ... |
| Brandon Fischer | | | | | ... |

METHOD FOR NOTIFYING TASK PROVIDERS TO BECOME ACTIVE USING INSTANT MESSAGING

CROSS-REFERENCE TO RELATED APPLICATIONS

This application is related to and claims the benefit of U.S. Application Ser. No. 60/807,423, filed Jul. 14, 2006, inventor Scott A. Jones, et al., titled INSTANT MESSAGE NOTIFICATION OF SERVICE PROVIDERS, in the United States Patent and Trademark Office, the disclosures of which is incorporated herein by reference.

BACKGROUND

1. Field

The present invention is directed to providing instant message notifications and, more particularly, to assigning requests to providers using instant message notifications.

2. Description of the Related Art

An estimated 867 million instant messaging accounts existed at the end of 2005, more than 13.9 billion instant messages are sent each day and management of AOL® Instant Messenger (AIM®)) estimates its users are logged on to AIM® more than six hours per day. By the year 2009, there are expected to be 1.9 billion instant messenger accounts and 46.5 billion instant messages sent per day.

As instant exchange of information increases, instant messaging services such as MSN® Messenger, AOL® Instant Messenger (AIM), ICQ®, Google® Talk and other instant messaging services are becoming widespread as a preferred medium of communication. Although functionality of instant messaging clients varies among service providers, typical instant messaging clients are accessed using a subscriber screen name or other identification (ID) information of subscribers and allow the subscribers to maintain a contact or a "buddy" list of other subscribing users to which the subscribers may send messages. A subscriber is alerted whenever any one of the users in the "buddy" list is online and may initiate a chat session with the particular user(s) online. Typically instant messaging services are used for personal interaction between two or more subscribers of an instant messaging service.

The combination of real-time communication similar to that offered by the telephone with the anonymity of the Internet has made instant messaging technologies a viable venue for social networks. The widespread use of instant messaging for communication among users in social networks has led to development of various technologies that enable instant messaging across various platforms of text- or speech-based devices such as desktop computers, laptops, cell phones, telephones, smart phones and personal digital assistants. However, current social networks are limited to personal interactions among restricted communities.

Although instant messaging is known for establishing real-time personal communication between users, there is no known way of assigning requests to service providers using these services.

SUMMARY

A method and system are disclosed for correlating a work request to a suitable provider among the providers based on content of the work request and delegating the work request to the suitable provider using an instant message service.

The method includes receiving a request, selecting provider(s) from a database of providers and notifying selected provider(s) using an instant message service.

The disclosed interface includes a display window that allows a requester to describe a request and send notification using an instant messaging service to selected provider(s) who may acknowledge receipt of the request using an instant messaging service.

The disclosed system includes an instant messaging service to notify selected provider(s), a request description mechanism for describing the request using keywords which may be qualified using geographic, or other data, and a server for correlating the keywords to provider(s).

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 10 is a table of keywords and providers maintained by a system.

DETAILED DESCRIPTION OF THE PREFERRED EMBODIMENTS

Figure 1:
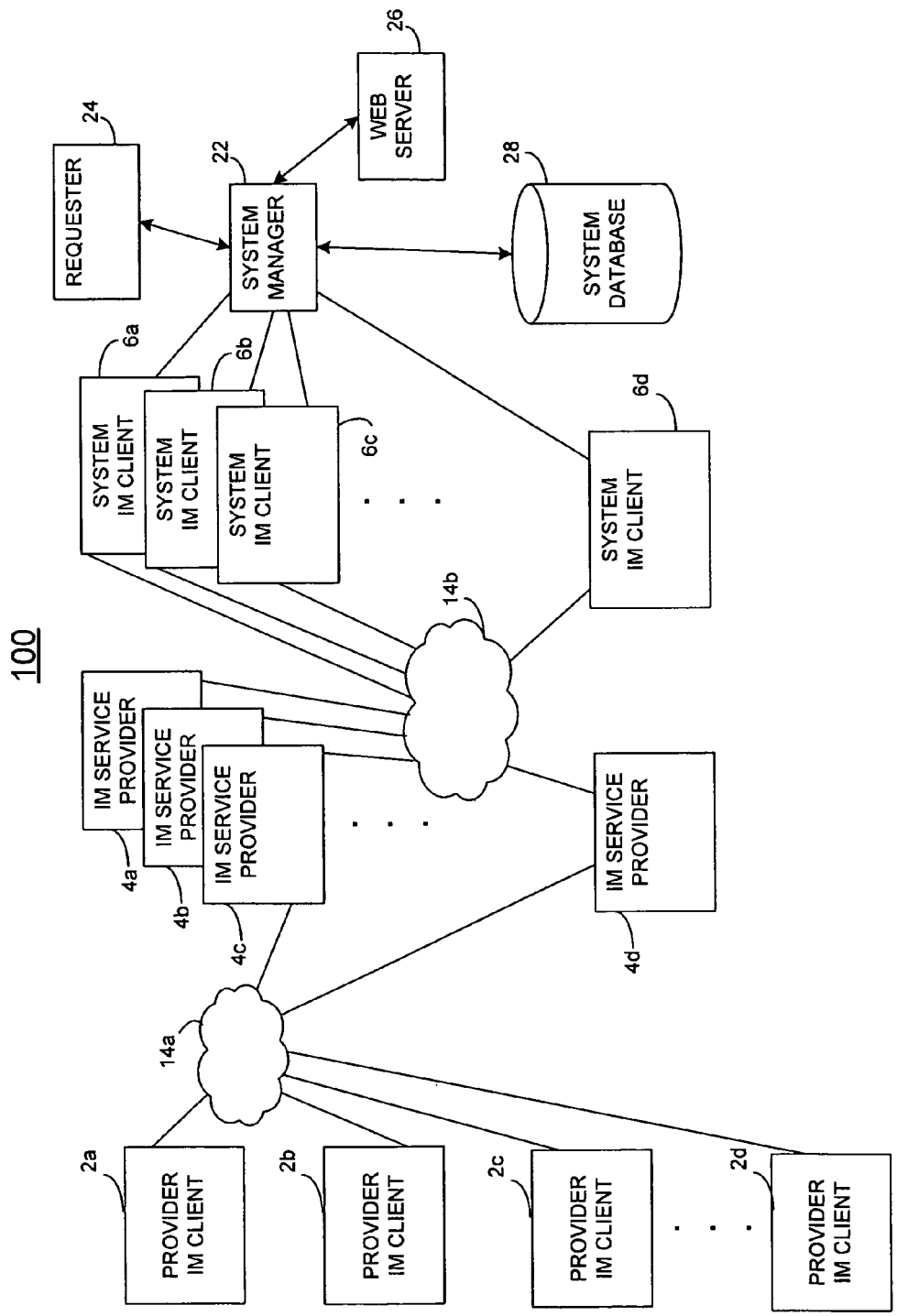
FIG. 1 is a block diagram of a system providing instant message (IM) notifications to providers.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

An instant message (IM) notification is sent to a provider in response to a request submitted from a requester. A requester is a system, person or entity making a request for assistance, such as a user requesting a search for information using the Internet. For example, a requester may be a system similar to the search system discussed in U.S. patent application Ser. No. 11/336,928, titled A SCALABLE SEARCH SYSTEM USING HUMAN SEARCHERS, inventor Scott A. Jones, filed Jan. 23, 2006, the disclosure of which is incorporated herein by reference. Amazon's Mechanical Turk™ service or similar systems may also be enhanced by these disclosures. A request is a task that needs to be performed by a provider(s) including but not limited to a search, photograph identification, transcription, translation, reservation, musical composition. A provider is an organization, person or other resource that is potentially available to perform the task described in the request, notification of which is conveyed via an instant messaging service. An instant message (IM) as used herein refers to any message transmitted using instant messaging technology including but not limited to messages exchanged using publicly available instant messaging services such as MSN® Messenger, AIM®, ICQ®, Google® Talk and other instant messaging services.

An exemplary embodiment of a system 100 providing instant message notifications to providers is illustrated in FIG. 1. As shown in FIG. 1, the system 100 has provider instant message (IM) clients including provider IM client 2a, provider IM client 2b, provider IM client 2c through provider IM client 2d that support instant message communication or "chat" using instant messaging services offered by IM service provider 4a, IM service provider 4b, IM service provider 4c through IM service provider 4d. The IM service providers 4 include various instant messaging services such as those offered by MSN® Messenger, AIM®, ICQ®, Google® Talk and other instant messaging services. For example, provider IM client 2a, provider IM client 2b, provider IM client 2c through provider IM client 2d establish communication using instant messaging services offered by the IM service providers (IM service provider 4a through IM service provider 4d) such as MSN® Messenger, AIM®, Yahoo!® Messenger, Google® Talk, iChat™, etc, via a network 14a. The provider IM client 2a through provider IM client 2d represent an IM client application implemented on a device enabled to be used by a provider for exchanging a message conveyed via an instant messaging service.

The network(s) 14a, 14b may be any publicly accessible network such as the Internet or a private network. For example, the network(s) 14a and/or 14b may be private and public networks such as a Local Area Network (LAN), Wide Area Network (WAN), etc., and may use protocols such as TCP/IP, LU 6.2, etc. The networks 14a, 14b may be the same network or multiple networks. Information exchanged via the provider IM clients 2 using instant messaging services offered by IM service providers 4 includes but is not limited to text based messages, images, multimedia, Uniform Resource Locator (URL) links, voice transmissions, including information exchanged using instant messaging services offering Voice Over IP (VoIP), such as Skype®, etc., from which a provider may receive notifications.

The system IM clients including system IM client 6a, system IM client 6b, system IM client 6c through system IM client 6d support exchange of instant messages across multiple platforms. For example, when an IM account of a person (i.e., a provider) registered to perform a requested work has an IM account with, e.g., MSN® Messenger, system 100 exchanges instant messages via system IM client 6a that is configured to support instant messaging services of MSN® Messenger. Similarly, when providers register to receive requests and/or notifications using IM accounts offered through AIM® and Google® Talk, the system 100 communicates via system IM clients 6b and 6c that support exchange of messages via AIM® and Google® Talk, respectively.

The system IM clients including system IM client 6a, system IM client 6b, system IM client 6c through system IM client 6d are connected with the system manager 22 (a computer system) that monitors, processes and manages requests submitted by requester(s) 24 and/or web server 26 and tracks responses to the requests from provider IM clients 2. A request may be submitted via the web server 26 and/or via the requester 24 using any device or system that can be connected in real-time to the system manager 22 (wirelessly or via wired connection) such as a computer system, a handheld computer such as a personal digital assistant (PDA), cellular telephone, a text-enabled cellular telephone, an electronic device such as a cable set-top box, a consumer appliance, an device in a car such as an On-Star system, a specialized request terminal or any other general purpose device that allows a user to submit a request. Similarly, a service provider handling the requested work may use any device that has IM communication functionality. As such, various types of work including web and voice based requests are handled by the system 100.

As shown in FIG. 1, the system manager 22 is connected with a system database 28. Although the system database 28 is illustrated as part of the system 100, the disclosed system is not limited to any type of database. For example, publicly accessible databases, private databases may be used in conjunction with or instead of the system database 28. The database 28 maintains information of provider(s), requester(s), request(s) and keywords correlated to the requests from the requester(s) and task results of the provider(s), including but not limited to providers quality of service ratings from prior request(s), keywords that the provider has chosen to help him receive requests, and other data that allow the system to select the provider. For example, metric information may include the number of requests submitted by a requester over a time period, the type of requests by keyword or category (correlated to the nature of the request), the number of request notifications received and/or acknowledged by a provider, the time period required to satisfy a request and other data indicating the capability of the provider.

The web server 26 receives web-based requests for provider(s). However, submission of requests via the system 100 is not limited to receiving web-based requests. For example, requests may be submitted using the requester 24, which may be a system or program configured to submit requests to the system manager 22 using an application programming interface (API). As previously mentioned, a requester may be a system similar to the search system discussed in U.S. patent application Ser. No. 11/336,928.

The system manager 22 receives requests from the requester 24 or the web server 26 and sends instant message notifications regarding the requests to one or more of the providers via the provider IM clients 2 using instant messaging services offered by IM service providers 4. Further, the system manager 22 maintains a local availability status of provider(s) based on availability information previously sent by the provider(s) via the provider IM clients 2. For example, the system manager 22 maintains a "buddy" list identifying each of the providers registered to perform work, and can be notified when any one of the providers are online and available. The system manager 22 may also records request(s) assigned to each provider(s) and can notify the provider via IM that a request is available for the provider(s). For example, requesters can check the "buddy list" of the system manager 22 to see if there are providers available to perform tasks such as searching within a particular category as disclosed in U.S. patent application Ser. No. 11/336,928, titled A SCALABLE SEARCH SYSTEM USING HUMAN SEARCHERS, inventor Scott A. Jones, filed Jan. 23, 2006, translating a piece of text, or identifying an individual from a photograph. For ease of explanation, the system manager 22, the system database 28, the system IM clients 6 and the requester 24 are shown in FIG. 1 as separate components of the system 100; however, their functionality may be executed on a single server.

Figure 2:
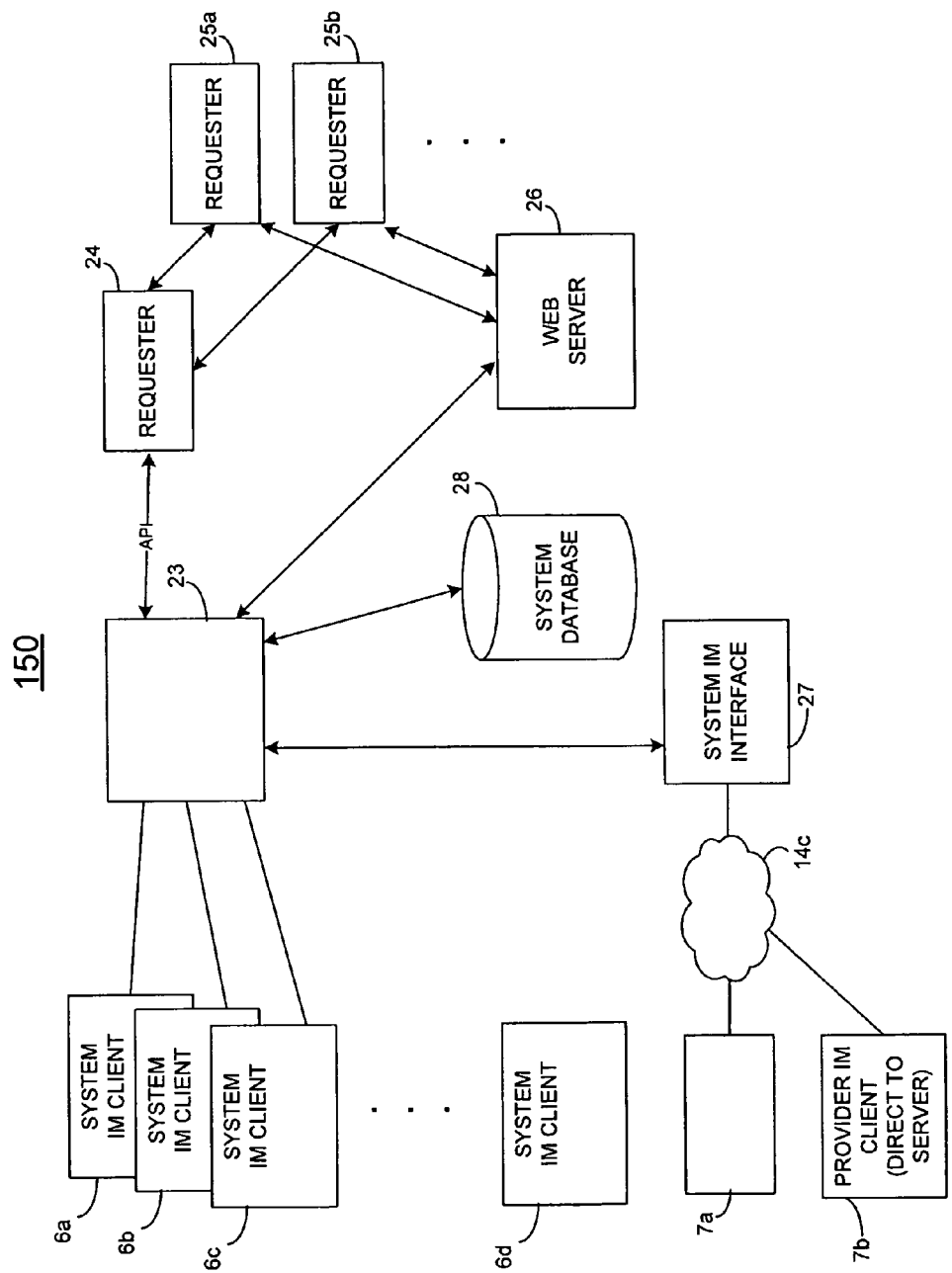
FIG. 2 is a block diagram of a system illustrating transmission of instant message notifications to providers.

As discussed above, the system 100 in FIG. 1 provides instant message notifications to service providers using instant messaging functionality of the IM services providers 4. When a provider does not have an IM service available from any of the IM services providers 4 shown in FIG. 1 to receive an IM notification, system 150 providing instant message notifications to service providers using a proprietary IM service may be used as illustrated in FIG. 2. As shown in FIG. 2, system 150 includes server 23, system IM clients 6, requester 24, system database 28, web server 26, system IM interface 27 and provider IM clients 7a, 7b. The requester 24 receives requests for work from human requester(s) such as human requester 25a and human requester 25b shown in FIG. 2 via any of the devices described above. Upon receipt of the requests for work, system 150 provides IM notifications to providers via either (or both) the provider IM clients 7a-7b and/or the system IM clients 6 (system IM client 6a through system IM client 6d) using various instant messaging services as discussed above.

In addition to the system IM clients 6, system 150 provides an independent instant messaging capability, to providers that may not have existing IM accounts, using provider IM clients 7a, 7b connected to the server 23 via network 14c and system IM interface 27. A provider may create an IM account by downloading the provider IM client 7a offered by the system 150 when the provider does not have an IM account or does not want to use existing instant messaging services such as those offered by MSN® Messenger, AIM, ICQ®, etc. Instant messaging user interface of the provider IM clients 7a, 7b may be provided via a floating window similar to typical IM windows supported by IM service providers 4, or using a window embedded within a provider application similar to the search system discussed in application Ser. No. 11/336,928. For ease of explanation, the server 23, the system database 28, the system IM clients 6 and the system IM interface 27 are shown in FIG. 2 as separate components of the system 150, however, their functionality may be executed on a single server.

The system 150 further includes system database 28 storing information of provider(s), requester(s) and requests received facilitating provider and requester registration and request submission. The web server 26 provides a web based registration page for registering provider(s) and/or requester(s) with the system 150 and a web based submission page for enabling the provider(s) and the requester(s) to enter keywords, and other data to describe their abilities and request details such as keywords, URLs, text or any other relevant data, respectively. For example, a requester who submits a request may access a web page on the web server 26 using any Internet connected device, such as a personal computer, a cell phone, a PDA, etc., and submit a request form describing the task to be completed. The request from the user is submitted to the server 23 and subsequently an IM notification is sent to at least one of the provider(s) using one of the system IM clients 6 and/or the system IM interface 27. Submission of a request and correlation of the request to a provider is explained in detail below with respect to FIG. 5.

Figure 3:
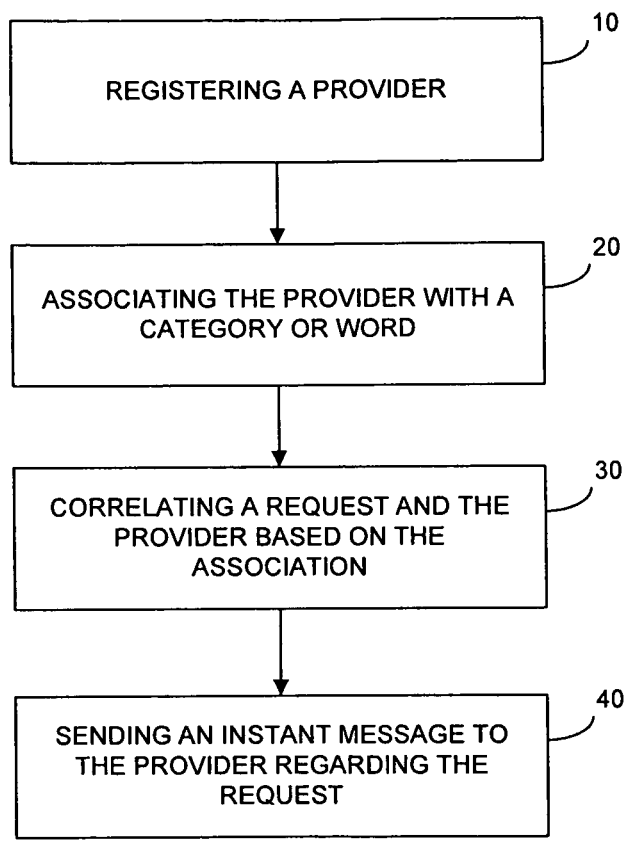
FIG. 3 is a flowchart illustrating sending an instant message notification of a request to a provider.

An exemplary process 200 for providing IM notifications to providers is illustrated in FIG. 3. As shown in FIG. 3, process 200 begins with registering 10 a provider. The provider may become aware of a request (task) in response to IM notification or based on public knowledge, such as advertisements, word of mouth, news and announcements, etc., industry level solicitation through which a particular industry or field of expertise is targeted and/or through other provider(s) who have already registered and cause a notification to be sent to the provider via IM or e-mail with a URL link to a registration page on the web server 26 shown in FIGS. 1 and 2.

Registering 10 a provider includes capturing information of the provider which may include IM credentials of the provider identifying the provider within a corresponding instant messaging service (e.g., account information for MSN®, Yahoo®, etc.) used by the provider. A confirmation message including a Uniform Resource Locator (URL) will be sent to the provider using the captured IM credentials to verify the IM account used by the provider and a default password to be used at initial logon. If the provider does not have an IM account, the provider is able to download the system's IM clients 7 illustrated in FIG. 2. Registration 10 is described in detail below with respect to FIG. 4.

After registering 10, process 200 continues with associating 20 the provider with a category, or keyword(s) such as area of interest (e.g. neurology), skill set (e.g. PhD), type of work (e.g. surgery) or other identifier. The provider may identify category, keyword, area of interest, skill set, type of work, or another identifier that describes the provider and allows instant message notifications of requests. The provider may or may not need to be an "expert" in the specific subject matter or category, but at least should be capable of performing the work requested. The term "keyword" may include one or more keywords and keyphrases (i.e. groups of keywords that have collective meaning) that can include multiple keywords as well as natural language sentences that can be analyzed to extract keywords and keyphrases.

The system may also parse through descriptive text input by the provider during provider registration 10 and automatically associate the provider with a category, keyword word or keyphrase based on information input by the provider. For example, when the provider indicates himself or herself as an expert in areas associated with health (e.g. Neurologist) or identifies an area of interest identifiable by the system as related to health (e.g. Respiratory Therapist), the provider is associated with a category 'health' and keyword(s) 'therapist', 'respiratory'. The category or keyword associated 20 with the provider is used to identify request(s) for which the provider has matching skills in order to assign suitable requests to the provider. Subsequently, the category and/or keyword(s) associated with the provider may be updated by the provider or the system manager 22 as the provider fulfills requests, or other data is made available to the system which would further qualify the keywords associated with the provider. A provider may also be associated with multiple categories or keywords and receive requests correlated to those category(s) or keywords.

Subsequently, when a request is received by system manager 22 or server 23 (FIGS. 1 and 2) and the provider has been associated 20 with a category or keyword, process 200 continues by correlating 30 the request to provider(s) based on category(s) or keyword(s) associated with provider(s). For example, a request from a user relating to appraisal of an antique is correlated 30 to provider(s) associated with a category or keyword related to appraisal and/or antique. A keyword database and taxonomy offered by Trellian may be used to associate keywords with categories and several levels of sub-categories, as per the DMOZ directory structure, so that if a provider cannot be found associated with a specific keyword, then a category or subcategory that is associated with that keyword may be utilized to find a provider who is at least in the same category or subcategory.

Based on the correlation 30, process 200 continues by sending 40 an instant message notification to sufficiently correlated provider(s) of the request. For example, an instant message using MSN® Messenger will be sent to the provider using the IM credentials of the provider obtained during registering 10 of the provider. The instant message notifies the provider of the request, provides a description of the work, references additional information of the request, etc., and preferably includes a URL which may launch an application to communicate with web-enabled services for performing the work contained in the request as described in detail below with respect to FIG. 5.

Figure 4:
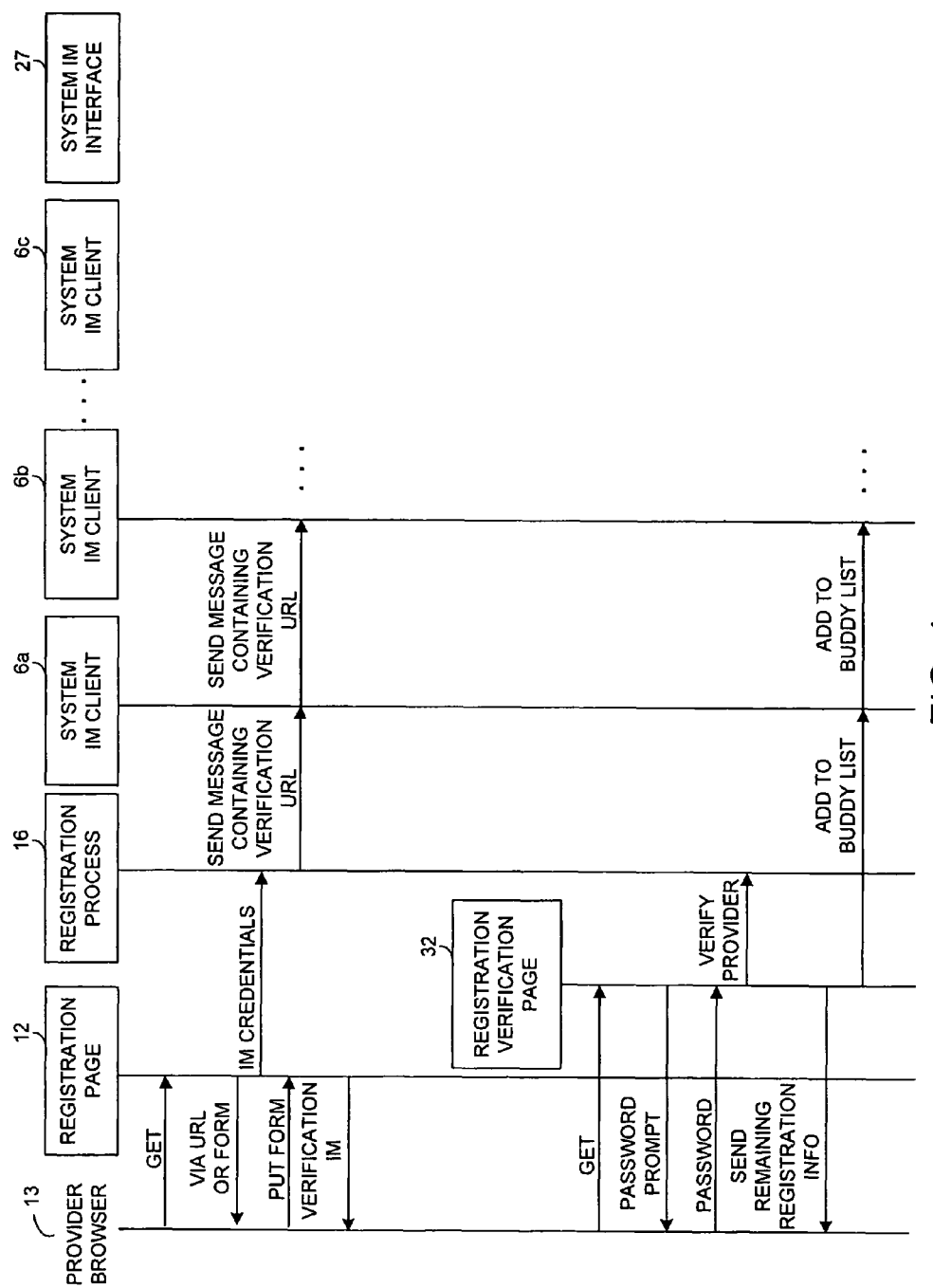
FIG. 4 is a communication flow diagram illustrating registration of a provider.

In a preferred embodiment, registering 10 is performed as illustrated in FIG. 4. A provider accesses a registration page 12 via a provider browser 13 and uses a form on the registration page 12 to enter data of the provider to register for IM notification(s) of work requests. The provider submits identification information including IM credentials or IM alias to registration process 16 executing on, e.g., server 23 (FIG. 2). Information of the provider captured by registration process 16 includes IM credentials, geographic information, Internet Protocol (IP) address, and other information about the provider that may qualify and/or associate keywords with the provider. The keywords may subsequently be used to correlate the provider to request(s).

When the provider accesses the registration page 12 for registering as a provider to receive instant message notification, the provider has an option of registering to use the system IM clients 7 (FIG. 2) via system IM interface 27, or an existing IM account offered by one of the IM service providers 4 (FIG. 1) which communicates with system manager 22 or server 23 via system IM clients 6.

The registration process 16 sends a message containing a verification URL to the provider's instant message account using system IM clients 6 or system IM interface 27 that corresponds to the IM service selected by the provider. The provider clicks on the URL in the instant message to begin a sequence of operations to complete registration. In response, the registration page 12 sends a verification IM which includes unique ID and password generated for logging in provider 13. For example, a message including the password for logging in and a URL which is a link to the registration page 12 and a cookie with a unique ID for a provider is sent to the MSN® Messenger account of a provider, who has specified the MSN® Messenger account for registration.

The provider is directed to a registration verification page 32 that prompts the provider to enter the password sent with the verification IM. Upon the provider's input of the password, the provider is verified and added to the "buddy" list as a provider who can be notified of a request using IM notifications. The registration verification page 32 may send additional registration information to the provider via the provider browser 13.

Figure 5:
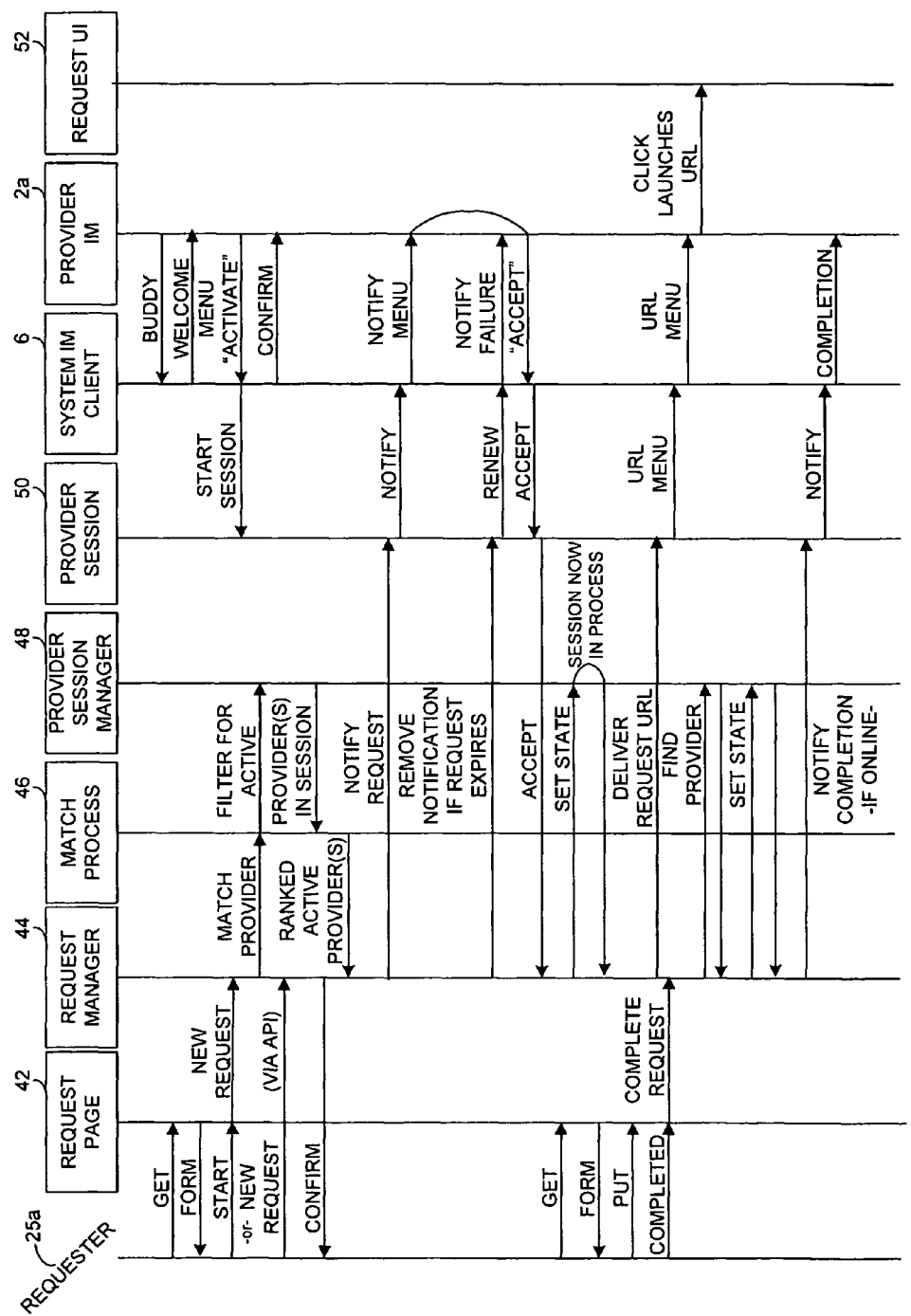
FIG. 5 is a communication flow diagram illustrating transmission of instant message notification for a request.

FIG. 5 provides an overview of correlating provider(s) with requests and sending notifications using instant message services. A requester 25a (FIG. 2) submits a request via web server 26 or requester 24. As shown in FIG. 5, requester 25a submits a request by obtaining a form on a request page 42 generated by web server 26. Using the form on the request page 42, the requester 25a may enter data defining the request which is converted into keywords and submit the request for processing. For example, the request page 42 form may be rendered using XHTML or HTML and include elements such as an input field(s), a submit button, etc., to allow the requester 25a to enter data, keywords, or other information which describe the request. This form generates keywords correlated to the request(s).

A request from the requester 25a may also be submitted using the requester 24 via an API as shown in FIG. 2. The API enables exchange of data between requester 24 submitting request from requester 25a and the server 23 as illustrated in FIG. 2. The requester 25a is a user requesting a task to be completed. A request can be submitted using a device such as desktop or laptop computer, handheld computer, personal digital assistant (PDA), basic cellular telephone, text-enabled cellular telephone or other device capable of submitting a request via the requester 24 and/or web server 26 using the request page 42. A request submitted from the requester 25a can be a natural language query (e.g., a fully-stated question) a set of keywords, or other data. Alternatively the request might be submitted by voice input stating the type of work required and/or selecting a desired skill set from a list. The requester 24 may also receive voice requests via a basic cellular telephone, a text-enabled cellular telephone, a specialized device, or any other source that allows the requester 25a to enter a request. For example, a system similar to the search system discussed in application Ser. No. 11/336,928.

The completed request page 42 is delivered to request manager 44 as a new request. The new request, whether submitted using the request page 42 or the requester 24 (FIGS. 1 and 2), is correlated to provider(s) in accordance with a selection process 46. For example, each provider that is associated with the category health is identified during the selection process 46 when the request contains keyword(s) correlated to the category 'health'. Similarly, when a request submitted is correlated with the category 'basketball', the selection process 46 selects registered provider(s) that have keyword(s) or categories correlated to 'basketball'. As such, the selection process 46 selecting the provider(s) is able to assign the request in real-time to providers in the database of provider(s) most strongly correlated to the request.

The selection process 46 may include a ranking component that ranks two or more provider(s) correlated to the request to determine suitability of the provider(s) to fulfill the request. Ranking of provider(s) enables targeting a request to a specific group, person, or globally to allow selection of the best possible provider to fulfill the request at any given time, based on the data available to the system. Provider(s) may be ranked, for example, based on requester ratings of previous request(s), time interval required to fulfill the request, geographic proximity to a location from which a request originated, or any other relevant criteria. For example, a provider who has successfully completed 90% of requests assigned to the provider would be ranked higher than another provider who has successfully completed 60% of the requests assigned. However, the ranking component of the selection process 46 is not limited to any particular criteria for ranking provider(s) against a request and any factor pertinent to a request may be considered in ranking provider(s).

Provider session manager 48 in FIG. 5 maintains a record of active provider(s) that are available to accept request(s). The provider session manager 48 determines availability of selected provider(s) to fulfill the request as determined by the selection process 46. For example, the provider session manager 48 uses IM credentials of providers, such as the buddy list, for determining availability status of the providers and creates a list of available provider(s) when a request is received. Availability status of providers may be dependent upon IM systems of the providers; for example, determination of availability status may be accomplished via the buddy list. The provider session manager 48 may have its own account or accounts on the IM systems so that it is able to communicate with providers on each of the IM systems and detect when providers are available. The system 100 may communicate with existing IM systems of providers using technologies such as Extensible Messaging and Presense Protocol (XMPP) and the open source implementation/components of Jabber. Accordingly, the provider session manager 48 determines whether any of the providers is available without interrupting the providers, enabling efficient distribution of requests.

An aggregate list of available provider(s) selected to fulfill the new request is created by the selection process 46. The provider session manager 48 may transmit notification to the requester via the request manager 44. The request manager 44 notifies provider session 50 to provide an IM notification to the selected available provider(s) (concurrently or sequentially) describing the request using system IM clients 6 and/or system IM interface 27 (FIG. 2, not shown in FIG. 5). In the case of concurrent notification, the provider session 50 will periodically resend notification until the request is accepted by at least one provider or the time period for responding to the request has expired. A provider may accept a request by acknowledging receipt of the IM notification and/or by replying to the IM notification, sending an e-mail, using a GUI interface (e.g., clicking on a button) on an IM notification window, etc.

Further, if more than one provider is required to fulfill the request, the request manager 44 continues notifying selected providers until the required number of providers acknowledge the notification or accept the request. When a provider accepts a request, the status of that provider is updated in the provider session manager 48. For example, when a provider accepts a request, that provider may be removed from the list of selected providers available to fulfill a request.

The notification describing the request may include a time frame during which to send notification(s) to provider(s) during which time the provider(s) can accept the request and within which the task(s) described in the request are to be completed by the provider(s). For example, the notification sent by the request manager 44 may be sent at a future point in time, the provider(s) can accept or decline the request within the specified period of time and provider(s) in receipt of the notification(s) may have a specified time period within which the task(s) described in the request must be completed.

Depending on the nature of the request, providers may be sequentially notified of the request. For example, a notification of a request sent to a provider who does not respond to the notification within a time period set automatically or by the requester may be renewed and/or sent to other provider(s) selected to fulfill the request, e.g., in the order of the ranking as determined by the selection process 46. The notification renewal time period may vary according to the details of the request i.e. the request specifies a time interval or end time for fulfillment of the request. In addition, instant messaging services such as Skype® and others that archive a message to a user who is either not visible or offline to deliver the message the next time the user is online may be used to deliver a notification of a request.

When at least one of the providers has acknowledged the notification and/or accepted the request, the request manager 44 may sends a notification to the provider session 50 to indicate to the IM clients 6 of providers that have not accepted the request and/or the system IM interface 27 removing the notification or indicating that the request has been accepted by other provider(s). Upon acceptance of the request by the specified number of providers, the request manager 44 may send an acknowledgement notification to the requester 25*a*.

The request manager 44 instructs the provider session manager 48 to set the state of the request to indicate that fulfillment of the request is in progress. The request manger 44 also delivers the request to the provider session 50. The IM notification may include description of the work or task to be completed, a string of characters as a URL that is recognizable by typical IM clients as a link to a Web Server page or a link to an application for performing the work that causes the application to be launched via the provider user interface (UI) 52. For example, Java® Web Start may be used to enable a Java® application to be directly started on the desktop of provider(s). Using Java® Web Start technology, standalone Java® software applications can be deployed with a single click over the network, for example, via a URL link such as what is delivered to one or more providers as part of the IM message. Java® Web Start may also be implemented to ensure that the most current version of an application program used by providers will be deployed, as well as the correct version of the Java Runtime Environment (JRE). For example, a URL will point to a Java® Network Launching Protocol and API (JNLP) page on the web server 26 which provides all of the deployment and launching configuration settings needed in order for Java® Web Start to launch the application on a provider's desktop.

In addition, the request may be delegated to other provider (s) using a URL that has mail to: information and may include title of a mail message. The URL may launch, for example, a default mail application with recipient information already completed based on information maintained in the database 28 (FIG. 1) for enabling an e-mail notification to be sent to deliver the request.

After a request has been fulfilled, the provider sends a notification to the system manager 22 (FIG. 1) which may be sent to the requester 25*a* using a device such as desktop computer, laptop computer, cell phone, telephones, personal digital assistants, or other devices that can access the web server 26 or the server 23. Upon receipt of the notification, the requester 25*a* may indicate that request was fulfilled and rate the provider(s) performance using a form on the request page 42 which is communicated to the request manager 44. The request manager 44 locates the provider fulfilled the request from the requester 25*a* based on the ID of provider(s) determined via the provider session manager 48 and may change the status and update the ranking of the provider. The provider may also be notified of the requester rating or other data from the requester via IM notification sent via the system IM clients 6 and/or the system IM interface 27.

Figure 6:
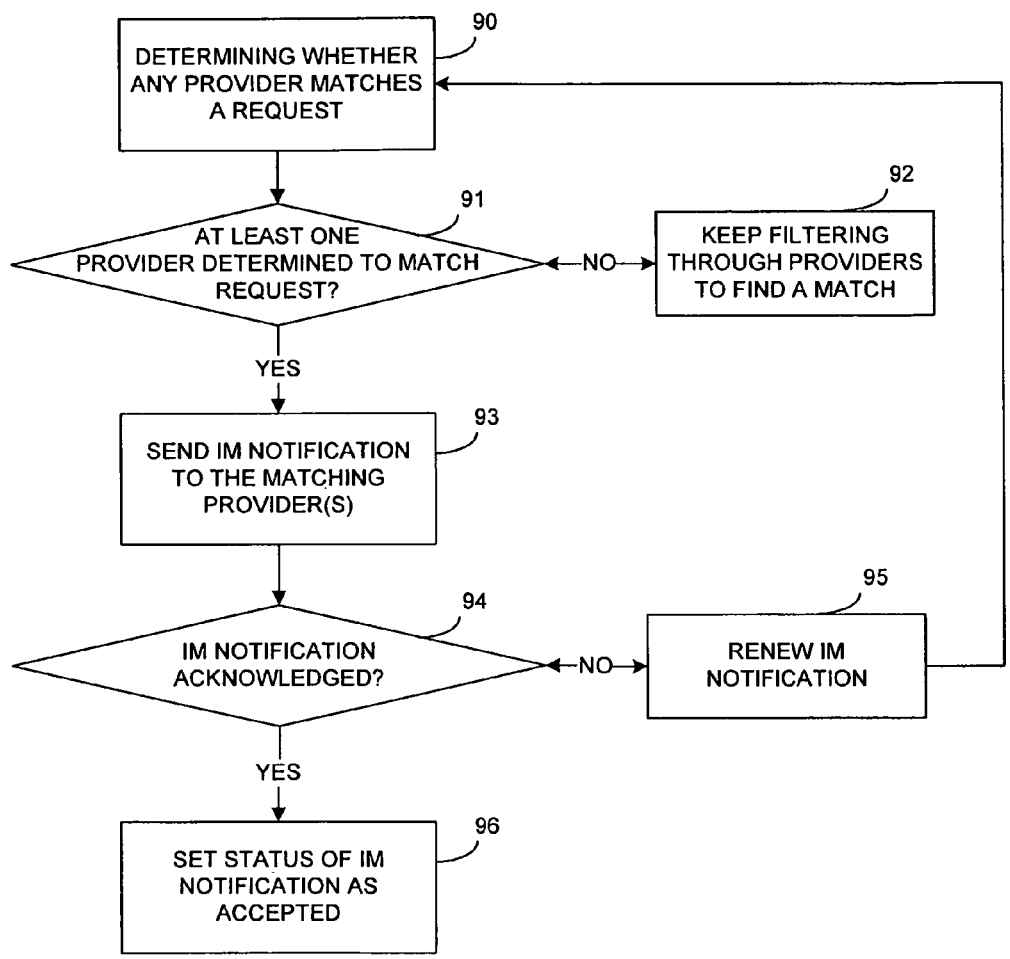
FIG. 6 is a flowchart for providing notification(s) to selected provider(s).

FIG. 6 illustrates a process 250 for providing an instant message notification to provider(s). As shown in FIG. 6, process 250 begins by determining 90 whether a provider exists to fulfill the request. For example, when a request is submitted keywords are generated and qualified either by the requester or passively (GPS data, type of request, type of display capability) associated with the request which correlate to a category or keyword with which a provider(s) may be associated.

After starting 90, process 250 moves to determining 91 if a selected provider(s) exists to fulfill the request. Upon determining that there is no selected provider(s) for the request, process 250 continues to filtering 92 the list of registered providers to find a selected provider. For example, filtering 92 includes searching through all provider(s) that are available until at least one provider associated with the keyword(s) of the request is available, or finding a provider that matches some subset of the keyword(s) associated with the request.

When it is determined that at least one selected provider exists 91 the request, process 250 moves to sending 93 IM notification of the request to the selected provider(s).

Subsequent to sending 93 IM notification to provider(s), process 250 verifies whether the IM notification is acknowledged 94 by selected provider(s). Upon determining that the IM notification is acknowledged 94, process 250 moves to setting 96 status of request as accepted. If it is determined that the IM notification is not acknowledged by the selected provider(s), selection database is updated 95 and process 250 returns to determining 91 if a selected provider exists. For example, updating 95 includes repeatedly sending the IM notification to selected but unavailable provider(s) that did not acknowledge the IM notification until the IM notification is acknowledged 94.

Figure 7:
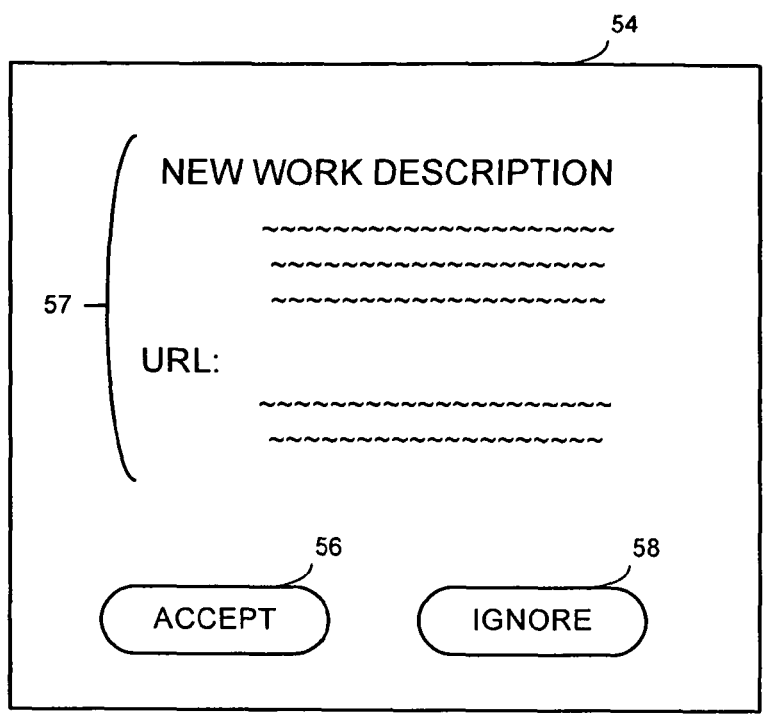
FIG. 7 is a screen shot of a provider instant message window displaying a request notification.

FIG. 7 illustrates a provider IM window 300 displaying a request prompt 54 to provider(s) selected for a request. The request prompt 54 may include a description 57 of the request and a user control enabling the provider(s) to acknowledge or accept 56, or reject or ignore 58 the request indicated 54. The description 57 may include data to allow the provider to complete the request, reference(s) to additional details of the request and action inputs which may initiate an application to communicate with web-enabled services. For example, the request described in the request prompt 54 may be a request for transcribing an audio file or a request for a real-time search using a query and may include a link to an application to launch an application to be used for performing the search as further described in the patent application herein referenced.

When a provider receives the request IM notification via an instant messaging service of the system IM client 6 and/or provider IM 2a (shown in FIG. 5), the provider may click on the URL contained in the request to launch an application for performing the task requested. This may also send back an acknowledgement to the server 23 by IM. The work description may include an indication(s) of how the work may be accomplished, the requested delivery time, the format of the work, and other details of the request. For example, the URL directly launches the ChaCha™ Guide™ application on the desktop of the provider using Java Web Start. However, the URL is not limited to launching the ChaCha™ Guide™ application and components similar to Java Web Start, for example, an applet, which can be distributed as a link in the IM notification and executed. A web browser may be used to launch an application linked to a URL which can assist in fulfilling the request.

Figure 8:
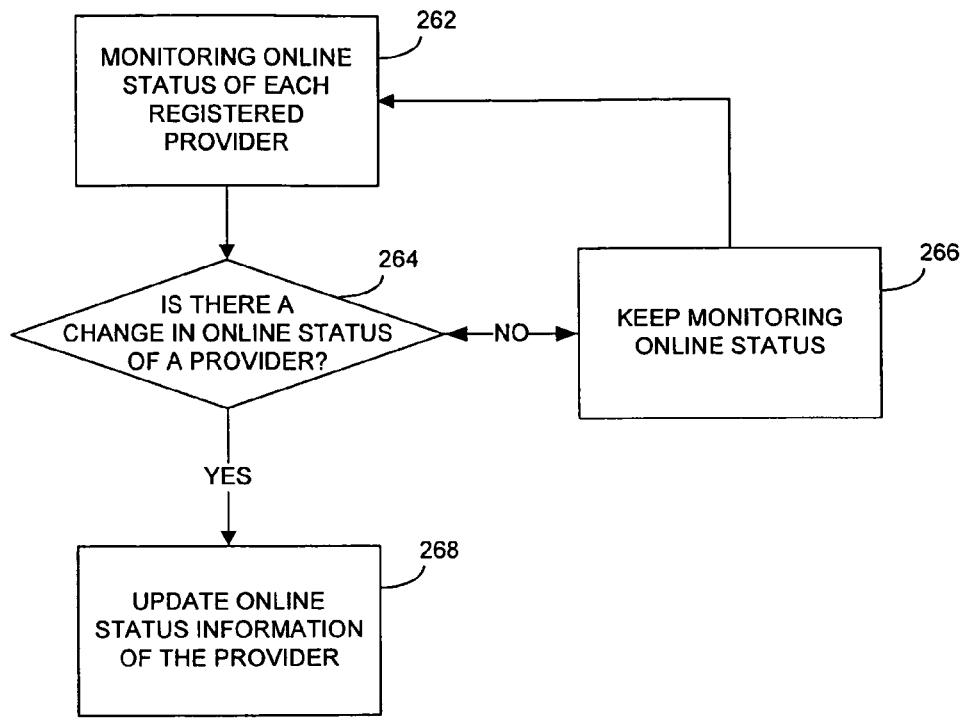
FIG. 8 is a flowchart for obtaining localized keywords for a provider.

FIG. 8 illustrates a process 260 for evaluating or monitoring availability status or another local (not available in the database 28 keyword(s) of a provider(s). As shown in FIG. 8, process 260 begins by monitoring 262 availability and status of a provider(s). For example, IM credential or IM alias of a provider submitted during registration that indicates when the provider is online and offline may be used to evaluate availability status of the provider.

If there is no change 264 in availability status process 260 moves to monitor or evaluate 266 availability status. Upon determining that there is change 264 in availability status of provider(s), process 260 proceeds to update 268 database 28. For example, change 264 of availability status includes evaluating a provider(s) logged on or logged off flag and comparing the current value to the previous value obtained from the database 28, etc. When there is a change 264 of availability status of a provider(s), process 260 updates 268 availability status in the database 28 for the provider(s). For example, a list of available provider(s) maintained by the provider session manager 48 (FIG. 5) is updated to reflect when a provider logs on or logs off from an IM client of the provider(s).

The updating 268 of availability status in the database 28 may be requested or triggered only when online status and/or other parameters of provider(s) is changed by an event at the IM client(s) 2 (FIG. 1) of the provider(s). For example, online status or other parameters stored in the provider application (or the provider's system) are updated to the database 28 when they are changed by local events.

Figure 9:
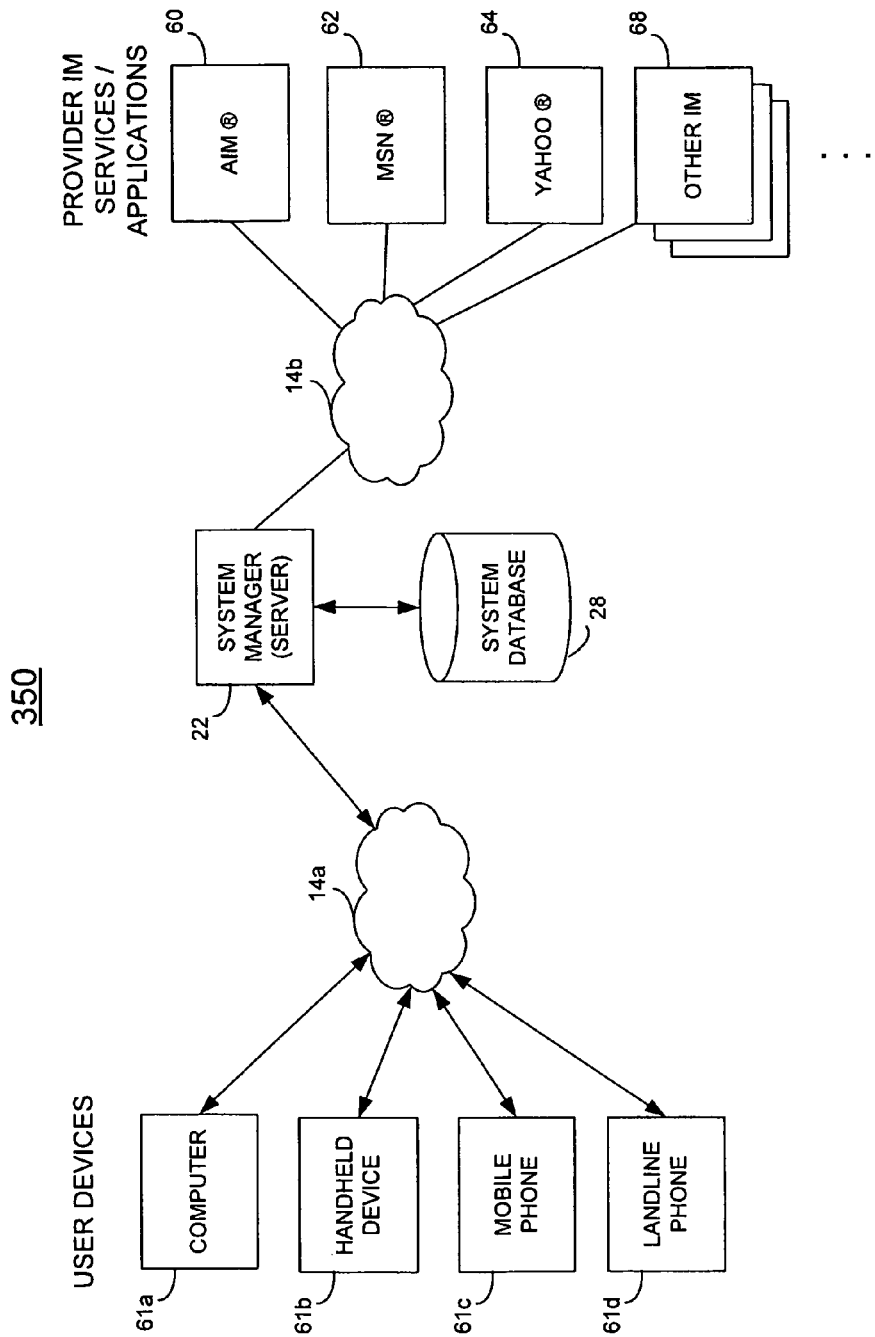
FIG. 9 is a block diagram of an exemplary system for managing and monitoring a network of requesters and providers.

An exemplary diagram of a system 350 managing and monitoring an online provider workforce is illustrated in FIG. 9. As shown in FIG. 9, system 350 enables users to submit requests to the system manager 22 using communication devices such as computer 61a, handheld device 61b, mobile phone 61c, landline phone 61d via network 14a. The system manager 22 communicates with provider IM services and/or applications such as AIM® 60, MSN® 62, Yahoo® 64 and other IM service(s) 68 via network 14b. The system manager 22 checks availability of selected provider(s), updates the provider(s) availability status and allows provider(s) to modify availability. For example, the provider(s) may choose not available status for a given period of time subsequent to logging into the providers' IM services.

The system 350 shown in FIG. 9 maintains persistent connection to a base of human service provider(s) using the instant messaging services offered via AIM® 60, MSN® 62, Yahoo® 64 and other IM service(s) 68 and provides notifications to the provider(s). The system 350 further facilitates fulfillment of request(s) by interacting with users submitting requests via the computer 61a, handheld device 61b, mobile 61c or landline phone 61d. As described with respect to FIGS. 1 and 2, the database 28 maintains records of requests, requesters, and providers.

The system manager 22 sends requests to available provider(s) that are selected to fulfill the requests, displays information to the provider(s) such as amounts earned for completed requests, amounts that could have been earned while unavailable, etc. The system manager 22 allows providers to become part of the online workforce by simply clicking a link to an Internet address (URL) and entering corresponding IM address, instant messaging network (such as MSN®, AIM®, Yahoo®, or ICQ®), and optionally indicating areas of interest and/or expertise.

FIG. 10 illustrates a simplified table of provider information maintained in database 28 by system manager 22. The provider table 78 includes provider(s) 74, category or keyword 76, IM credentials 71, provider status 73, IM (online) status 75 and other information 77 pertinent to selecting provider(s) to fulfill requests and provider IM notification. As shown in FIG. 10, the provider 74 including provider 74a through provider 74n are associated with category or keyword 76. For example, the category or keyword 76 for provider 74a includes, "basketball", "computers", "literature", "food and drink" and "arts", while provider 74b is associated with "health", "arts", "American authors" and "search engines" and provider 74c is associated with "literature", "basketball" and "restaurants in Indiana." The IM credentials 71 for provider 74a through provider 74n includes identification data that identifies each provider with respect to their corresponding IM service. Using provider 74a as an example, if an MSN® account is to be used for sending IM notification to provider 74a, the IM credentials of the MSN® account is stored as IM credentials 71 with respect to provider 74a.

As further illustrated in FIG. 10, provider status 73 and IM (online) status 75 with respect to provider 74a though provider 74n is maintained in provider table 78 in the system. For example, the provider status 73 with respect to provider 74b is indicated as inactive when, for example, provider 74b is in the process of handling a request and the IM (online) status 75 is updated to available when the provider 74*b* signs into an IM service.

Figure 11:
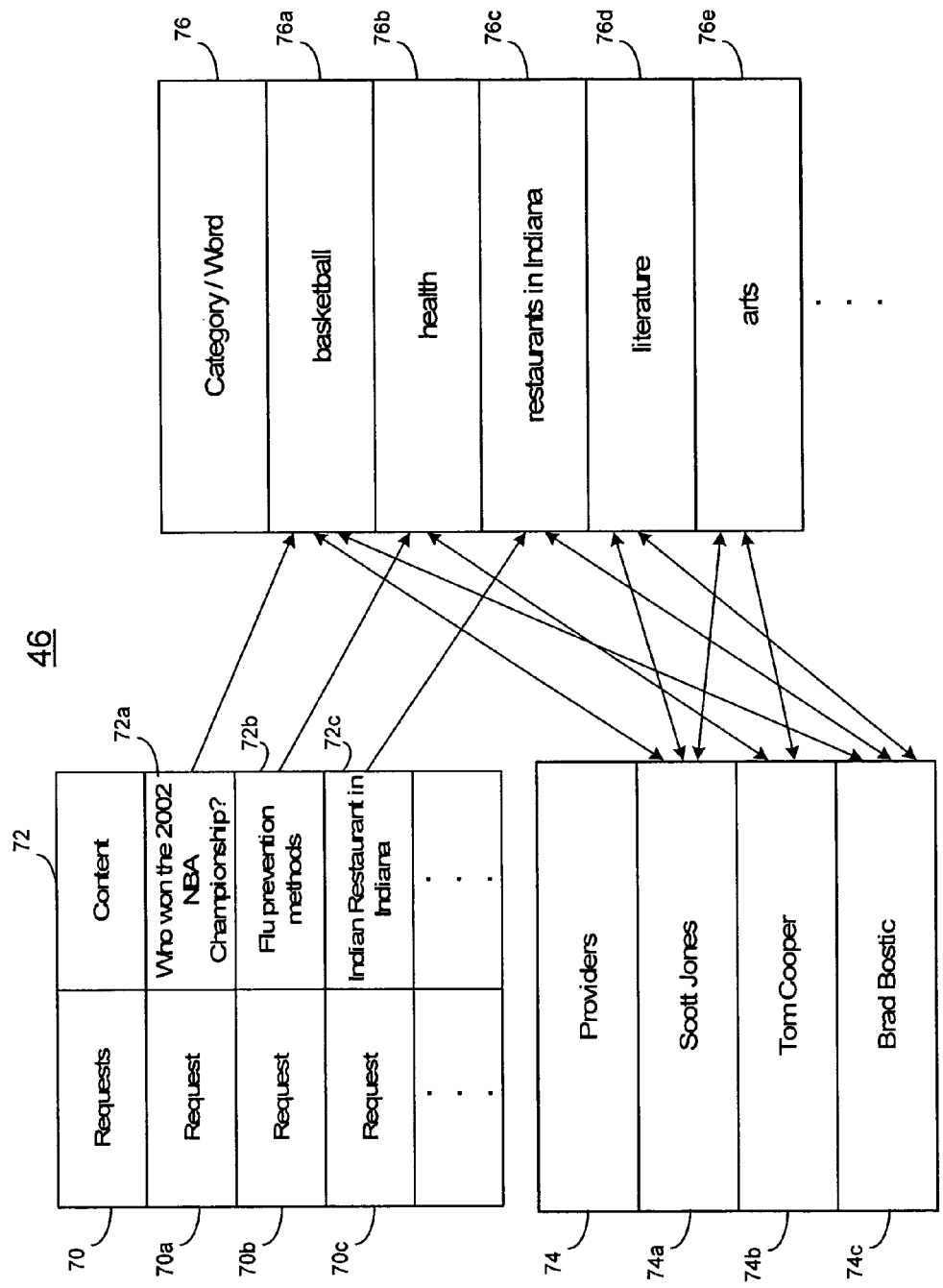
FIG. 11 is an example relationship diagram for correlating request(s) to provider(s) based on keyword(s) associated with request(s).

As shown in FIG. 11, a simplified example of a table relationship 46 between requests 70 have contents 72 that correlate with a category or keyword 76 that are associated with providers 74. The sample database entries illustrate correlation between the requests 70 and the providers 74 using the category or keyword 76. For example, request 70a has "who won the 2002 NBA championship?" and may be associated with the category "basketball" 76*a* because "NBA" may be a high-ranking keyword in the category "basketball." Similarly, requests 70*b* and 70*c* have "flu prevention methods" and "Indian restaurant in Indiana" as contents, respectively. The contents 72*b* and 72*c* corresponding to requests 70*b* and 70*c*, respectively, are associated with category "health" 76*b* and "restaurants in Indiana" 76*c* which correlate to providers 74*b* "Tom Cooper" and 74*c* "Brad Bostic". As such, the selection process 46 (FIG. 5) correlates the content 72 of requests 70 category(s) or keyword(s) 76 associated with providers 74 to determine selection of the providers 74 to fulfill the requests 70. More detail regarding associating keywords and/or categories with a provider (or searcher) may be found in U.S. patent application Ser. No. 11/336,928, titled A SCALABLE SEARCH SYSTEM USING HUMAN SEARCHERS.

Figure 12:
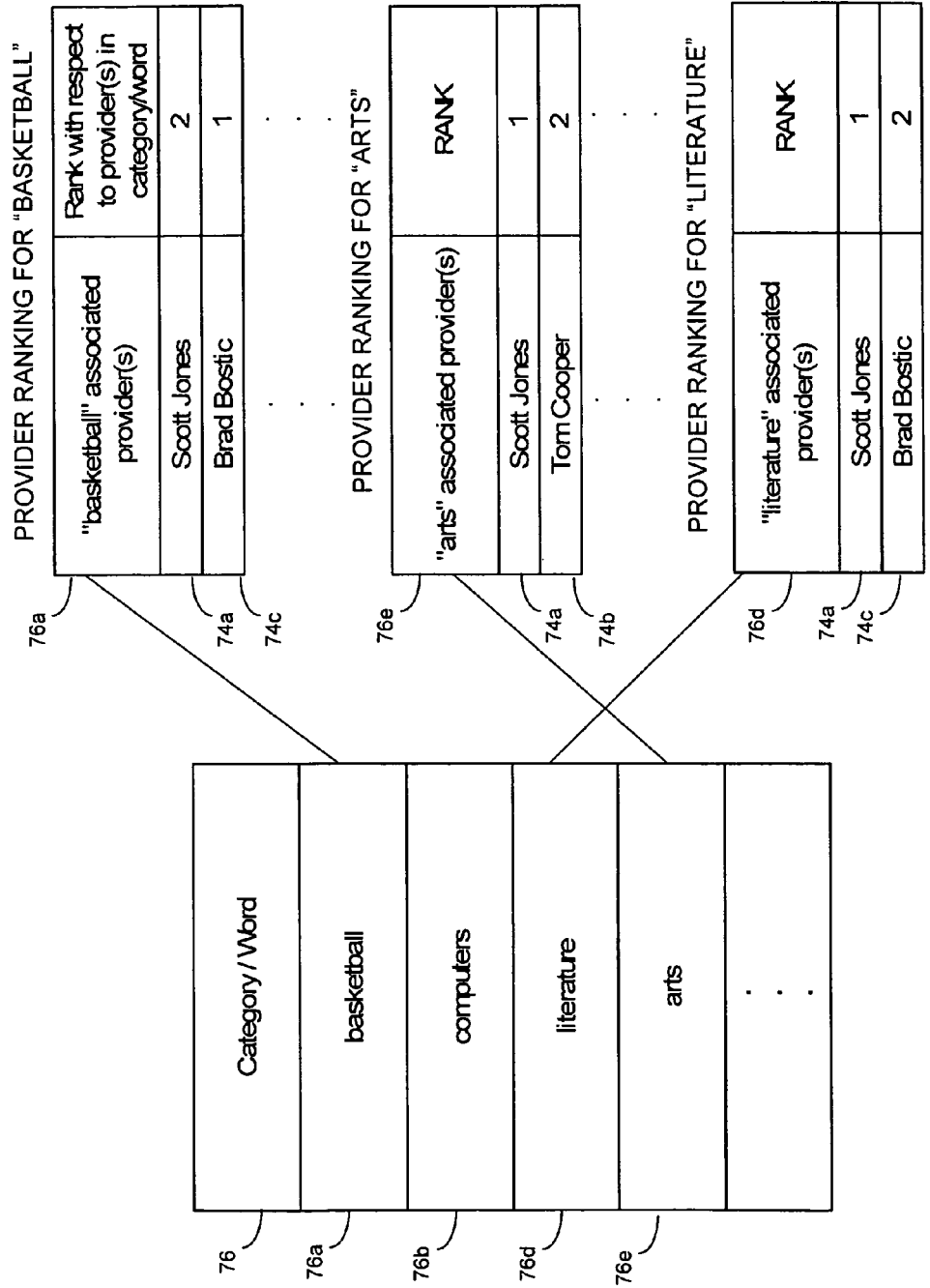
FIG. 12 an example table relationship diagram for correlating provider(s)' keyword or category rating(s) versus that of other provider(s).

FIG. 12 shows a simplified example of ranking of provider (s) against other providers associated with the same category or keyword. For example, for the category "basketball", of the providers associated with the category "basketball" 76*a*, provider 74*a* is ranked number 2 and provider 74*c* is ranked number 1. For the category "arts", of the providers associated with the category "arts" 76*e*, provider 74*a* is ranked number 1 and provider 74b is ranked number 2. For the category "literature" 76*d* provider 74*a* is ranked number 1 and provider 74*c* is ranked number 2.

Figure 13:
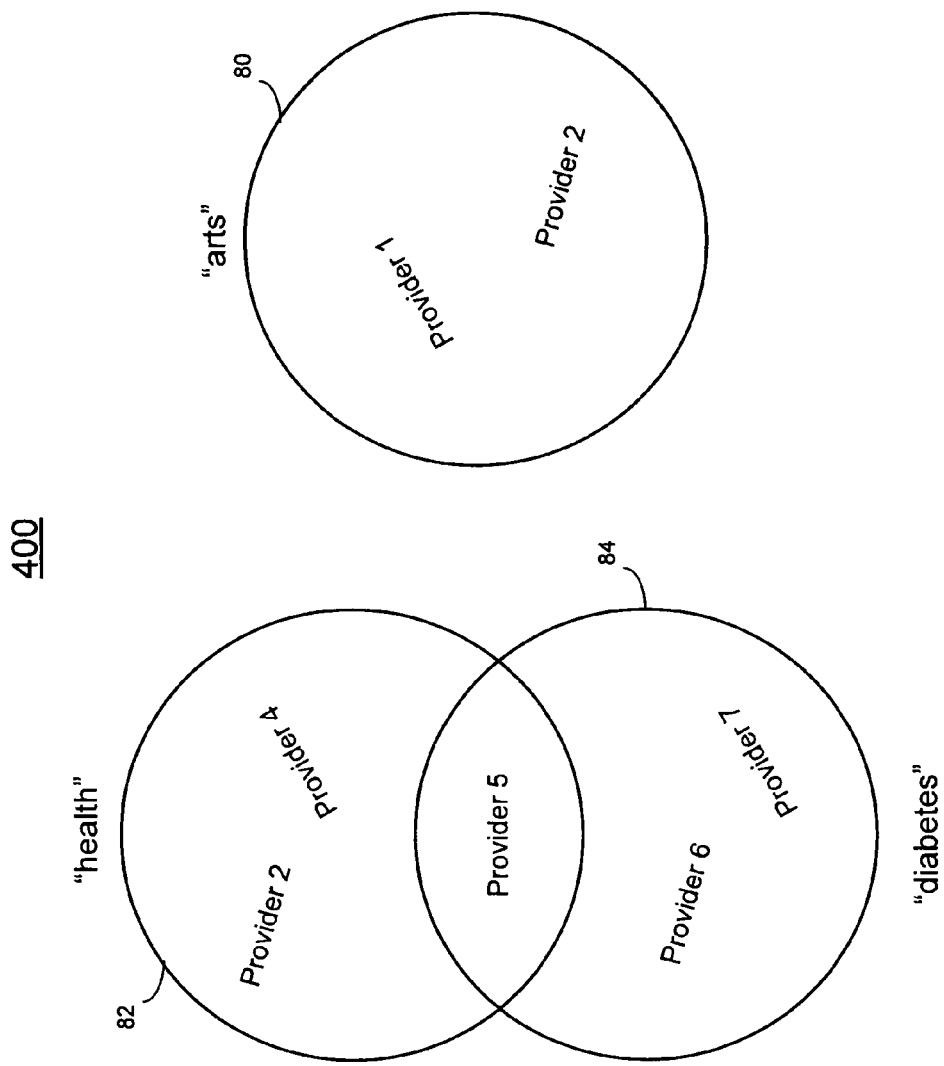
FIG. 13 is a Venn diagram for an example of provider networks.

FIG. 13 illustrates networks 400 of providers associated with a particular category or keyword. A provider network refers to a relationship between two or more providers including provider communities created based on association of the providers with a specific category or keyword. For example, providers 1 and 2 associated with "arts" form a provider network 80 and provider 5 through provider 7 associated with "diabetes" form a provider network 84. It is also possible to have a provider network that has overlapping provider(s) and for a provider to be part of more than one provider network. For example, as shown in FIG. 13, provider 5 is a member of provider network 82 associated with "health" and provider network 84 associated with "diabetes." An IM notification of a request for a category corresponding to a network can be sent to all of the providers who are members of the network.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope thereof. It will further be understood that the phrase "at least one of A, B and C" may be used herein as an alternative expression that means "one or more of A, B and C."

What is claimed is:

1. A computer implemented method, comprising:
   receiving a request for information indicating a keyword;
   associating providers with the keyword of the request;
   rating the providers for the keyword based on search results provided responsive to previous requests;
   assigning an active status to the providers when the providers can accept requests;
   associating a standby status with the providers when the providers are not assigned the active status and are currently accepting messages from an instant messaging service;
   ranking, by a processor, the active status providers based on the rating of the active status providers for the keyword;
   ranking, by the processor, the standby status providers based on ratings of the standby status providers;
   offering an opportunity to accept the request to a highest ranking active status provider;
   sending an instant message which requests a provider to change to active status to a highest ranking standby status provider;
   adjusting a standby status provider's rating based on whether the provider changes from standby status to active status responsive to the instant message;
   modifying the ranking of the active status providers when the opportunity is not accepted by an active status provider;
   modifying a rank of the active status provider when the active status provider is offered the opportunity to accept the request;
   modifying the ranking of the standby status providers when the instant message is sent; and
   returning, by one of the providers, a search result responsive to the request.

2. The computer implemented method according to claim 1, wherein the request is a request to perform an information search and the provider is selected based on a task type associated with the provider and the request, the task type excluding performing the information search.

3. The computer implemented method according to claim 1, comprising:
   providing in the instant message to the standby status provider a Uniform Resource Locator linking to an application used to change the standby status provider to active status.

4. The computer implemented method according to claim 1, wherein the instant message is delivered using an instant message service identifier associated with an instant message service registering users including persons other than the providers.

5. The computer implemented method according to claim 4, comprising:
   delivering the instant message to the highest ranking standby status provider using an instant messaging service exclusively registering the providers when the request is accepted.

6. The computer implemented method according to claim 1, wherein the ranking of the standby status providers is based on ratings of the standby status providers for previous work requests indicating the keyword.

7. The computer implemented method according to claim 6, comprising:
   maintaining a record of collections of providers associated with the keyword; and
   ranking the providers based on ratings of the collections.

8. The computer implemented method according to claim 1, comprising:
   notifying the active status providers when the request is accepted.

9. The computer implemented method according to claim 8, wherein instant messaging services of the providers support exchange of instant messages across multiple messaging service providers.

10. The computer implemented method according to claim 1, comprising:
- maintaining information of the request including a work product of the provider generated in response to the request; and
- offering the opportunity to accept the request to the provider based on a rating of the work product by another provider.

11. A system comprising:
- a user device submitting a request for information indicating a keyword;
- a server device associating providers with the keyword of the request,
- rating the providers for the keyword based on search results provided responsive to previous requests,
- assigning an active status to the providers when the providers can accept requests,
- associating a standby status with the providers when the providers are not assigned to the active status and are currently accepting messages from an instant messaging service,
- ranking the active status providers based on the rating of the active status providers for the keyword,
- ranking the standby status providers based on ratings of the standby status providers,
- offering an opportunity to accept the request to a highest ranking active status provider,
- sending an instant message which requests a provider to change to active status to a highest ranking standby status provider,
- modifying the ranking of the active status providers when the offer is not accepted by an active status provider,
- modifying a rank of the active status provider when the active status provider is offered the opportunity to accept the request;
- modifying the ranking of the standby status providers when the instant message is sent, and
- adjusting a standby status provider's rating based on whether the provider changes from standby status to active status responsive to the instant message, and
- returning a search result of one of the providers responsive to the request.

12. A non-transitory computer readable medium storing therein a program for causing a computer to execute an operation including notification of providers, comprising:
- receiving a request for information indicating a keyword;
- associating providers with the keyword of the request;
- rating the providers for the keyword based on search results provided responsive to previous requests;
- assigning an active status to the providers when the providers can accept requests;
- associating a standby status with the providers when the providers are not assigned the active status and are currently accepting messages from an instant messaging service;
- ranking the active status providers based on the rating of the active status providers for the keyword;
- ranking the standby status providers based on ratings of the standby status providers;
- offering an opportunity to accept the request to a highest ranking active status provider;
- sending an instant message which requests a provider to change to active status to a highest ranking standby status provider;
- modifying the ranking of the active status providers when the opportunity is not accepted by an active status provider;
- modifying a rank of the active status provider when the active status provider is offered the opportunity to accept the request;
- adjusting a standby status provider's rating based on whether the provider changes from standby status to active status responsive to the instant message;
- modifying the ranking of the standby status providers when the instant message is sent; and
- returning a search result of one of the providers responsive to the request.

\* \* \* \* \*